United States Patent [19]

Kohyama et al.

[11] Patent Number: 4,684,713

[45] Date of Patent: Aug. 4, 1987

[54] HYDROCARBON TERMINATED POLYAMIDE RESIN AND PROCESS FOR PRODUCING THE SAME

[75] Inventors: Katsuhisa Kohyama; Masaaki Miyamoto; Hidemi Nakanishi, all of Kitakyushu; Norimichi Koga, Mizumaki, all of Japan

[73] Assignee: Mitsubishi Chemical Industries Limited, Tokyo, Japan

[21] Appl. No.: 815,506

[22] Filed: Jan. 2, 1986

[30] Foreign Application Priority Data

Jan. 14, 1985 [JP]  Japan .................................... 60-4557

[51] Int. Cl.$^4$ ....................... C08G 69/14; C08G 69/26
[52] U.S. Cl. .................................... 528/315; 528/318; 528/336; 525/420
[58] Field of Search .................. 528/315, 318, 336; 525/420

[56] References Cited

U.S. PATENT DOCUMENTS

| | | | |
|---|---|---|---|
| 3,819,758 | 6/1974 | Cleary | 528/336 |
| 4,366,306 | 12/1982 | Smith | 528/315 |
| 4,507,462 | 3/1985 | Stille | 525/420 |

FOREIGN PATENT DOCUMENTS 2134123  2/1984  United Kingdom .

OTHER PUBLICATIONS

Abstract of Japanese Patents 19264, 19265, 19266, 1969.

*Primary Examiner*—Harold D. Anderson
*Attorney, Agent, or Firm*—Oblon, Fisher, Spivak, McClelland & Maier

[57] ABSTRACT

Disclosed herein are a polyamide resin of a relative viscosity of from 2.5 to 6, having hydrocarbon group(s) of 6 to 22 carbon atoms as the end group(s) thereof, the number of the hydrocarbon group(s) being 40 to 100% of the total number of the end groups of the polyamide, and a process for producing the polyamide resin.

9 Claims, No Drawings

HYDROCARBON TERMINATED POLYAMIDE RESIN AND PROCESS FOR PRODUCING THE SAME

BACKGROUND OF THE INVENTION

The present invention relates to a polyamide resin and a process for producing the same, and more in detail, the present invention relates to the polyamide resin excellent in mechanical properties and moldability.

Polyamide resin is excellent in mechanical properties and accordingly, it is broadly used as an engineering plastic material, however, improvements have been demanded on the bending resistance thereof, particularly at a low temperature.

As a result of the present inventors' studies for improving the mechanical properties of polyamide resin, the present inventors have found that the polyamide resin of a specified relative viscosity having the specified hydrocarbon group(s) as the end groups thereof is excellent in mechanical properties, particularly, bending resistance and tensile strength at a low temperature and also excellent in melt-fluidity and in mold releasability, and based on this findings the present invention have attained.

SUMMARY OF THE INVENTION

In a first aspect of the present invention, there is provided a polyamide resin showing a large industrial value and a relative viscosity of 2.5 to 6, and having hydrocarbon group(s) of 6 to 22 carbon atoms as the end groups thereof in number of from 40 to 100 % of the total number of the end groups thereof.

In a second aspect of the present invention, there is provided the process for producing the polyamide resin having hydrocarbon group(s) of 6 to 22 carbon atoms as end group(s) of said polyamide and showing a relative viscosity of from 2.5 to 6, the number of said hydrocarbon group being 40 to 100% of total number of end groups of said polyamide, comprising the step (A) of subjecting the starting materials for producing a polyamide to polycondensation, and subjecting the thus obtained polycondensate to condensation with (1) a monocarboxylic acid of from 7 to 23 carbon atoms and a monoamine of from 6 to 22 carbon atoms and/or a diamine of from 2 to 22 carbon atoms, (2) a monoamine of from 6 to 22 carbon atoms and a dicarboxylic acid of from 3 to 24 carbon atoms or (3) a monocarboxylic acid of from 7 to 23 carbon atoms or a monoamine of 6 to 22 carbon atoms under a pressure of lower than 400 Torr, in the final stage of the condensation or the step (B) of subjecting the starting materials for producing a polyamide to polycondensation in the presence of (1) a monocarboxylic acid of from 7 to 23 carbon atoms and a monoamine of from 6 to 22 carbon atoms and/or a diamine of from 2 to 22 carbon atoms, (2) a monoamine of from 6 to 22 carbon atoms and a dicarboxylic acid of from 3 to 24 carbon atoms or (3) a monocarboxylic acid of from 7 to 23 carbon atoms or a monoamine of from 6 to 22 carbon atoms under a pressure of lower than 400 Torr in the final stage of the polycondensation.

DETAILED DESCRIPTION OF THE PRESENT INVENTION

The polyamide resin according to the present invention is a polyamide obtained by polycondensation (or copolymerization) of a lactam having not less than three members ring, a polymerizable ω-amino acid or a dicarboxylic acid with a diamine, etc. As the starting material of the polyamide, lactams such as ε-caprolactam, enantolactam, capryl lactam, lauryl lactam, α-pyrrolidone and α-piperidone, ω-amino acids such as 6-aminocaproic acid, 7-aminoheptanoic acid, 9-aminononanoic acid and 11-aminoundecanoic acid, dicarboxylic acids such as adipic acid, glutaric acid, pimelic acid, suberic acid, azelaic acid, sebacic acid, undecanedioic acid, dodecanedioic acid, hexadecanedioic acid, hexadecenedioic acid, eicosanedioic acid, eicosanedienedioic acid, diglycolic acid, 2,2,4-trimethyladipic acid, xylylenedicarboxylic acid, 1,4-cyclohexanedicarboxylic acid, terephthalic acid and isophthalic acid, and diamines such as hexamethylenediamine, tetramethylenediamine, nonamethylenediamine, undecamethylenediamine, dodecamethylenediamine, 2,2,4- or 2,4,4-trimethylhexamethylenediamine, bis(4,4'-aminocyclohexyl)methane and m-xylylenediamine may be mentioned.

As the hydrocarbon groups of 6 to 22 carbon atoms according to the present invention, aliphatic hydrocarbon group(s) such as hexyl group, heptyl group, octyl group, 2-ethylhexyl group, nonyl group, decyl group, undecyl group, dodecyl group, tridecyl group, tetradecyl group, tetradecylene group, pentadecyl group, hexadecyl group, heptadecyl group, octadecyl group, octadecylene group, eicosyl group and docosyl group, alicyclic hydrocarbon group(s) such as cyclohexyl group, methylcyclohexyl group and cyclohexylmethyl group and aromatic hydrocarbon group(s) such as phenyl group, toluyl group, benzyl group and β-phenylethyl group may be mentioned.

Each of these hydrocarbon group(s) is introduced into the starting mixture on occasion of producing the polyamide by using the carboxylic acid and the amine.

As the end group of the polyamide according to the present invention (hereinafter referred to as the present polyamide), the amino group and the carboxyl group derived from the starting material of the present polyamide other than the hydrocarbon group(s) are present.

The hydrocarbon group(s) of the present polyamide is measured by gas chromatography after hydrolyzing the polyamide with hydrochloric acid. The amino end group of the present polyamide is measured by dissolving the present polyamide in phenol and titrating thereof with an aqueous 0.05N hydrochloric acid solution. The carboxyl end group of the present polyamide is measured by dissolving the polyamide in benzyl alcohol and titrating the thus obtained solution by an aqueous 0.1N sodium hydroxide solution. The total number of the end groups is the sum of the respective numbers of the hydrocarbon group(s), amino end group and carboxyl end group.

In the present polyamide, the number of the hydrocarbon group(s) is 40 to 100% of the total number of the end group. Reduction of the number of the hydrocarbon group(s) in the polyamide below 40% causes the reduction of the fluidity of the molten polyamide resin with the reduction of the bending resistance and the tensile strength of the polyamide and accordingly, the reduction of the number of the hydrocarbon group(s) in the polyamide is not desirable. Although it is desirable to have the number of the hydrocarbon group(s) of the present polyamide in the vicinity of 100% of the total number of the end groups from the view point of the physical properties of the present polyamide, since it is not so easy to produce such a polyamide, it is preferable to retain the percentage of the hydrocarbon group(s) in a range of 40 to 95%, more preferably in a range of 50 to 92%.

The relative viscosity of the present polyamide measured in 98% sulfuric acid at a concentration of 1% by weight and at 25° C. by using the method of Japanese Industrial Standard (JIS) K 6810 is in a range of 2.5 to 6, preferably 2.5 to 5.

Improvement of the resistance to fatigue of polyamide cannot be expected on the polyamide of the relative viscosity of lower than 2.5, and on the other hand, since polyamide of the relative viscosity of higher than 6 shows a poor fluidity in molten state, it is not desirable.

For producing the present polyamide, the starting materials for producing a polyamide are subjected to polycondensation and then the thus obtained polycondensate and (1) a monocarboxylic acid of 7 to 23 carbon atoms and a monoamine of 6 to 22 carbon atoms and/or a diamine of 2 to 22 carbon atoms, (2) a monoamine of 6 to 22 carbon atoms and a dicarboxylic acid of 3 to 24 carbon atoms or (3) a monocarboxylic acid of 7 to 23 carbon atoms or a monoamine of 6 to 22 carbon atoms are subjected to condensation under a pressure of less than 400 Torr in the final stage of condensation, or the starting materials for producing a polyamide are subjected to polycondensation in the presence of (1) a monocarboxylic acid of 7 to 23 carbon atoms and a monoamine of 6 to 22 carbon atoms and/or a diamine of 2 to 22 carbon atoms, (2) a monoamine of 6 to 22 carbon atoms and a dicarboxylic acid of 3 to 24 carbon atoms or (3) a monocarboxylic acid of 7 to 23 carbon atoms or a monoamine of 6 to 22 carbon atoms under a pressure of lower than 400 Torr in the final stage of the polycondensation.

As the monocarboxylic acid of 7-23 carbon atoms, aliphatic monocarboxylic acids such as enanthic acid, caprylic acid, capric acid, pelargonic acid, undecanoic acid, lauric acid, tridecanoic acid, myristic acid, myristoleinic acid, palmitic acid, stearic acid, oleic acid, linolic acid, arachic acid and behenic acid, alicyclic monocarboxylic acids such as cyclohexanecarboxylic acid and methylcyclohexanecarboxylic acid and aromatic monocarboxylic acids such as benzoic acid, toluic acid, ethylbenzoic acid and phenylacetic acid may be mentioned. In addition, those corresponding derivatives thereof which can play the same role as that of the above-mentioned carboxylic acid during the reaction of producing the present polyamide, for instance, acid anhydrides, esters and amides may be used.

As the monoamine of 6 to 22 carbon atoms, aliphatic monoamines such as hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine and docosylamine, alicyclic monoamines such as cyclohexylamine and methylcyclohexylamine and aromatic monoamines such as benzylamine and β-phenylethylamine may be mentioned.

In the present invention, if necessary, diamine of from 2 to 22 carbon atoms, dicarboxylic acid of from 3 to 24 carbon atoms, monocarboxylic acid of not more than 6 carbon atoms such as acetic acid or propionic acid and/or monoamine of not more than 5 carbon atoms such as methylamine or ethylamine may be used together with the above-mentioned monocarboxylic acid of 7-23 carbon atoms and/or monoamine of 6-22 carbon atoms.

As the diamines of from 2 to 22 carbon atoms, aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, octadecamethylenediamine and 2,2,4- or 2,4,4-trimethylhexamethylenediamine, alicyclic diamines such as cyclohexanediamine, methylcyclohexanediamine and bis(4,4'-aminocyclohexyl)methane, and aromatic diamines such as xylylenediamine may be mentioned.

As the dicarboxylic acid of from 3 to 24 carbon atoms, aliphatic dicarboxylic acids such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, hexadecanedioic acid, hexadecenedioic acid, octadecanedioic acid, octadecenedioic acid, eicosanedioic acid, eicosenedioic acid, docosanedioic acid and 2,2,4-trimethyladipic acid, alicyclic dicarboxylic acids such as 1,4-cyclohexanedicarboxylic acid and aromatic dicarboxylic acids such as terephthalic acid, isophthalic acid, phthalic acid and xylylenedicarboxylic acid may be mentioned.

For producing the present polyamide, a reaction may be initiated while using the above-mentioned starting materials and following a usual method (refer to U.S. Pat. No. 2,241,322, U.S. Pat. No. 2,241,323 and U.S. Pat. No. 2,071,250), and the above-mentioned carboxylic acid and amine may be added at the optional stage during the time from the initiation of the reaction to the time before the reaction under a reduced pressure is initiated. In addition, the carboxylic acid and the amine may be added at a time or separately.

The amounts of the carboxylic acid and the amine used in the reaction corresponds to 20 to 60 (μeq), preferably 25 to 55 μeq (1–10 meq, preferably 2–8 meq) of carboxylic groups and amino groups per one gram (one mol) of the total amount of the starting materials used for the present polyamide, respectively.

In the case where the amounts of the carboxylic acid and the amine are too small, it is not possible to produce the polyamide resin exhibiting the effects of the present invention, and on the other hand, in the case where the amounts are too large, it is not possible to produce the polyamide of a high viscosity and also unfavorable influences appear on the physical properties of the thus produced polyamide resin.

The present polyamide have been substituted by hydrocarbon group(s) in the end groups, and the relative viscosity of the present polyamide is higher than 2.5. In order to produce such a polyamide resin, it is necessary to carry out the reaction in the final stage of the reaction under a pressure of not higher than 400 Torr, preferably, not higher than 300 Torr, more preferably not higher than 200 Torr. In the case where the pressure in the final reaction stage is over 400 Torr, it is impossible to obtain the present polyamide of the desired relative viscosity, however, the lower pressure than 400 Torr shows no inconvenience. The reaction under the above reduced pressure may be carried out for longer than 0.5 hour, usually from 1 to 2 hours.

The present polyamide is excellent in mechanical properties, particularly in bending resistance and tensile strength at a low temperature, and also excellent in fluidity at a molten state and mold releasability.

Accordingly, the present polyamide can be molded into three-dimentional molded articles, containers, films, sheets, tubes and filaments suitable for use as the material elements for motorcars, aeroplanes, ships, electric- and electronic apparata and other industrial goods by various well-known methods of molding such as injection molding, extrusion molding, compression molding, etc.

Further, by blending the polyamide resin of the present invention with other resins such as polyamide resin other than the present polyamide, polyester resin, polycarbonate resin, polyacetal resin, polyolefin-series resin, polystyrene-series resin and the like, a resin composition having a further excellent physical property can be obtained.

Namely, the present polyamide is extremely useful in industrial fields.

The present invention will be explained more in detail while referring to the non-limitative examples and the comparative example as follows.

EXAMPLES 1 to 4

After introducing, into a 200-litre autoclave, 60 kg of ε-caprolactam, 1.2 kg of water and both stearic acid and octadecylamine in the respective amounts shown in Table 1, the autoclave was tightly closed under an atmosphere of gaseous nitrogen, and was heated to 260° C. to carry out the reaction for 2 hours under a pressure while stirring the content of the autoclave. Thereafter, the pressure of the autoclave was decreased to the value shown in Table 1, and the reaction was further continued for 2 hours under the reduced pressure.

After introducing gaseous nitrogen into the autoclave to bring the inner pressure of the autoclave to ordinary level, the stirring was stopped, and the reaction product was taken out in a strand state and chipped. The chipped product was treated with boiling water to extract and remove the unreacted monomer therefrom, and the thus treated product was dried.

Test pieces of the product for tensile- and bending tests were prepared by molding the thus obtained chipped product under the molding conditions of the temperature of the resin (chipped product) of 250° C., the temperature of the metal mould of 80° C., the injection time of 5 sec, the cooling time of 10 sec and the total cycle time of 18 sec while using a 3.6-ounce injection-molding machine (made by TOSHIBA Kikai Co., Ltd., Model: IS-75S) and a metal mould for molding test pieces of 10 mm in length, 10 mm in width and 2 mm in thickness.

The fluidity of the resin (the product) in a molten state was represented by the injection pressure at the time of injection. Tensile test was carried out by stretching 20 test pieces at a temperature of −10° C. under the instant tensile stress of 5 kgW and counting the number of broken test pieces in the 20 test pieces thus treated.

Bending test was carried out by bending 20 test pieces to an angle of 180° at a temperature of −10° C. and counting the number of broken pieces in the 20 test pieces thus treated.

The mould releasability of the present polyamide was determined by the following procedures:

Continuous injection molding of the present polyamide was carried out under the conditions of the temperature of the resin (chipped product) of 250° C., the temperature of a metal mould of 80° C., the injection time of 5 sec, the cooling time of 12 sec and the total cycle time of 20 sec while using the metal mould which can form a lattice having the ribs of 5 mm × 4 mm at an interval of 15 mm in a frame of 80 mm square, and the number of shots (shot for injection) was counted until the release of the molded polyamide resin from the mold began to deteriorate, and the results are shown in Table 1 wherein the mould releasability is shown in the following criteria and indices:

| Index | Criterion |
| --- | --- |
| A | Continuous injection could be carried out more than 25 shots. |
| B | Mould release began to deteriorate between the 10th shot and the 25th shot. |
| C | Mould release began to deteriorate before the 10th shot |

The thus obtained results of physical and chemical properties of the test pieces in Examples 1 to 4 are shown in Table 1.

COMPARATIVE EXAMPLE

For comparison, a polyamide was produced in the same manner as in Example 1 except for not using both stearic acid and octadecylamine and using acetic acid in an amount corresponding to 10 micro-equivalent of carboxyl group per one gram of the starting materials of the polyamide. The test results are shown also in Table 1.

TABLE 1

| Item | Example 1 | Example 2 | Example 3 | Example 4 | Comparative Example |
| --- | --- | --- | --- | --- | --- |
| Amount of stearic acid used | | | | | |
| (μeq./g) | 30 | 24 | 50 | 37 | 10 (acetic acid used) |
| (meq./mol) | 3.39 | 2.71 | 5.65 | 4.18 | 1.13 |
| Amount of octadecylamine used | | | | | |
| (μeq./g) | 30 | 24 | 50 | 37 | 0 |
| (meq./mol) | 3.39 | 2.71 | 5.65 | 4.18 | |
| Polycondensation pressure at final stage (Torr) | 200 | 200 | 10 | 30 | 500 |
| Relative viscosity of polyamide obtained ($\eta_{rel}$) | 2.86 | 3.10 | 2.60 | 3.03 | 2.90 |
| Amount of residual end $NH_2$ group (μeq./g) | 22 | 19 | 4 | 7 | 37 |
| Amount of residual end COOH group (μeq./g) | 21 | 19 | 5 | 8 | 47 |
| Ratio of blocking functional end groups (%) *1 | 58 | 56 | 92 | 83 | 0 |
| Injection pressure (kg/cm$^2$) | 400 | 500 | 280 | 450 | 500 |
| Mould releasability | A | A | A | A | C |
| Tensile strength (N*2/20) | 2 | 2 | 1 | 1 | 14 |

TABLE 1-continued

| Item | Example 1 | Example 2 | Example 3 | Example 4 | Comparative Example |
|---|---|---|---|---|---|
| Bending resistance (N*2/20) | 0 | 0 | 1 | 1 | 13 |

Notes:
*1 Ratio of the number of introduced hydrocarbon groups to the total number of the end groups of the product.
*2 N means the number of broken specimens by the test.

EXAMPLE 5

After introducing 60 kg of ε-caprolactam, 1.2 kg of water, 1.024 g (0.68 mol %) of stearic acid and 209 g (0.34 mol %) of hexamethylenediamine into an autoclave of a capacity of 200 litres, the content of the autoclave was treated by the same procedures as in Example 1 to produce a polyamide. The results are shown in Table 2.

EXAMPLE 6

After introducing 60 kg of ε-caprolactam, 1.2 kg of water, 775 g (0.54 mol %) of octadecylamine and 170 g (0.27 mol %) of adipic acid into an autoclave of a capacity of 200 litres, the content of the autoclave was treated by the same procedures as in Example 1 to produce a polyamide. The results are also shown in Table 2.

The thus obtained two polyamides in Examples 5 and 6, respectively showed the same excellent properties concerning mould releasability, fluidity in the molten state and resistance to fatigue as those of the polyamides obtained in Examples 1 to 4.

The results of testing those in Example 6 were also shown in Table 2.

EXAMPLE 7

In the same manner as in Example 1 except for using 830 g (0.54 mol %) of stearic acid and the polycondensation pressure at the final stage of 50 Torr instead of both stearic acid and octadecylamine and the pressure of 200 Torr, the present polyamide was produced. The results are shown in Table 2.

EXAMPLE 8

In the same manner as in Example 1 except for using 800 g (0.54 mol %) of octadecylamine and the polycondensation pressure at the final stage of 50 Torr instead of both stearic acid and octadecylamine and the pressure of 200 Torr, the present polyamide was produced. The results are shown in Table 2.

TABLE 2

| Item | Example 5 | Example 6 | Example 7 | Example 8 |
|---|---|---|---|---|
| Amount of carboxylic acid | stearic acid | adipic acid | stearic acid | |
| (μeq./g) | 60 | 48 | 48 | |
| (meq./mol) | 6.78 | 5.42 | 5.42 | |
| Amount of amine | hexamethylenediamine | octadecylamine | | octadecylamine |
| (μeq./g) | 60 | 48 | | 48 |
| (meq./mol) | 6.78 | 5.42 | | 5.42 |
| Polycondensation pressure at final stage (Torr) | 200 | 200 | 50 | 50 |
| Relative viscosity of polyamide obtained ($\eta_{rel}$) | 2.90 | 3.10 | 2.80 | 2.81 |
| Amount of residual end NH$_2$ group (μeq./g) | 22 | 20 | 3 | 51 |
| Amount of residual end COOH group (μeq./g) | 22 | 21 | 50 | 4 |
| Ratio of blocking functional end groups (%) *1 | 58 | 54 | 48 | 47 |
| Injection pressure (kg/cm$^2$) | 420 | 500 | 380 | 380 |
| Mould releasability | A | A | A | A |
| Tensile strength (N*2/20) | 2 | 2 | 3 | 4 |
| Bending resistance (N*2/20) | 0 | 0 | 1 | 1 |

Note:
*1 and *2 are the same as defined in Table 1.

What is claimed is:

1. A polyamide resin having at least one hydrocarbon group or 6 to 22 carbon atoms as the end group of said polyamide and showing a relative viscosity measured in 98% sulfuric acid at a concentration of 1% by weight and at 25° C. in the range of 2.5 to 6, the number of said hydrocarbon groups being 40 to 100% of the total number of end groups of said polyamide.

2. The polyamide resin according to claim 1, wherein the number of said hydrocarbon group(s) is from 50 to 92% of the total number of the end groups of said polyamide.

3. The polyamide resin according to claim 1, which shows a relative viscosity of 2.5 to 5.

4. A polyamide resin having at least one hydrocarbon group of 6 to 22 carbon atoms as the end group of said polyamide and showing a relative viscosity measured in 98% sulfuric acid at a concentration of 1% by weight and at 25° C. in the range of 2.5 to 6, the number of said hydrocarbon groups being 40 to 10% of the total number of end groups of said polyamide, and wherein said polyamide is produced by
    subjecting the starting materials for producing a polyamide to polycondensation, and subjecting the thus obtained polycondensate to condensation with a monocarboxylic acid from 7 to 23 carbon atoms or a monoamine of from 6 to 22 carbon atoms under a pressure of lower than 400 Torr in the final stage of the condensation.

5. A polyamide resin having at least one hydrocarbon group of 6 to 22 carbon atoms as the end group of said polyamide and showing a relative viscosity measured in 98% sulfuric acid at a concentration of 1% by weight and at 25° C. in the range of 2.5 to 6, the number of said hydrocarbon groups being 40 to 100% of the total number of end groups of said polyamide, and wherein said polyamide is produced by subjecting the starting materials for producing a polyamide to polycondensation in the presence of a monocarboxylic acid from 7 to 23 carbon atoms or a monoamine of from 6 to 22 carbon atoms under a pressure of lower than 400 Torr in the final stage of the condensation.

6. A process for producing a polyamide resin having at least one hydrocarbon group of 6 to 22 carbon atoms as the end group of said polyamide and showing a relative viscosity measured in 98% sulfuric acid at a concentration of 1% by weight and at 25° C. in the range of 2.5 to 6, the number of said hydrocarbon groups being 40 to 100% of the total number of end groups of said polyamide, comprising the step of subjecting the starting materials for producing a polyamide to polycondensation, and subjecting the thus obtained polycondensate to condensation with a monocarboxylic acid of from 7 to 23 carbon atoms or a monoamine of from 6 to 22 carbon atoms under a pressure or lower than 400 Torr in the final stage of the polycondensation.

7. A process for producing a polyamide resin having at least one hydrocarbon group of 6 to 22 carbon atoms as the end group of said polyamide and showing a relative viscosity measured in 98% sulfuric acid at a concentration of 1% by weight and at 25° C. in the range of 2.5 to 6, the number of said hydrocarbon groups being 40 to 100% of the total number of end groups of said polyamide, comprising the step of subjecting the starting materials for producing a polyamide to polycondensation in the presence of a monocarboxylic acid of from 7 to 23 carbon atoms or a monoamine of from 6 to 22 carbon atoms under a pressure of lower than 400 Torr in the final stage of the condensation.

8. The process according to claim 6 or 7, wherein the amount of said monocarboxylic acid and said monoamine corresponds respectively to 20 to 60 μeq., 1 to 10 meq., of carboxylic group and amino group per 1 g, per 1 mol, of the total amount of the starting material for producing the polyamide.

9. The process according to claim 6 or 7, wherein the pressure is lower than 300 Torr.

* * * * *